United States Patent
Tsukamoto et al.

(10) Patent No.: US 8,080,910 B2
(45) Date of Patent: Dec. 20, 2011

(54) MOTOR HAVING INSULATOR PROVIDED WITH PROTRUSIONS FOR LEAD WIRES TO BE TWISTED

(75) Inventors: Satoshi Tsukamoto, Kusatsu (JP); Hiroki Shirasaka, Kusatsu (JP); Hidemi Tanji, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 203 days.

(21) Appl. No.: 12/517,953

(22) PCT Filed: Oct. 9, 2007

(86) PCT No.: PCT/JP2007/069695
§ 371 (c)(1),
(2), (4) Date: Jun. 5, 2009

(87) PCT Pub. No.: WO2008/068955
PCT Pub. Date: Jun. 12, 2008

(65) Prior Publication Data
US 2010/0322793 A1    Dec. 23, 2010

(30) Foreign Application Priority Data

Dec. 8, 2006  (JP) ................. 2006-331615

(51) Int. Cl.
*H02K 11/00* (2006.01)
*H02K 3/50* (2006.01)
*H02K 3/52* (2006.01)
*H02K 3/00* (2006.01)

(52) U.S. Cl. .......... 310/71; 310/194; 310/204; 310/205; 310/206

(58) Field of Classification Search ............ 310/71, 310/194, 204–206; *H02K 11/00, 1/00, 3/00, H02K 19/26, 21/00, 23/40, 3/50, 3/52*
See application file for complete search history.

(56) References Cited

U.S. PATENT DOCUMENTS

| | | | | |
|---|---|---|---|---|
| 4,642,497 A | * | 2/1987 | Boyd, Jr. .................. | 310/68 R |
| 6,664,678 B2 | * | 12/2003 | Shimizu ..................... | 310/71 |
| 7,091,645 B2 | * | 8/2006 | Yoneda et al. ............. | 310/208 |
| 7,382,069 B2 | * | 6/2008 | Kumakura et al. ......... | 310/71 |
| 7,569,964 B2 | * | 8/2009 | Ijima ........................ | 310/194 |

(Continued)

FOREIGN PATENT DOCUMENTS

| | | |
|---|---|---|
| JP | 61-180563 U | 11/1986 |
| JP | 11-215756 A | 8/1999 |
| JP | 2001-28855 A | 1/2001 |

(Continued)

*Primary Examiner* — Quyen Leung
*Assistant Examiner* — Terrance Kenerly
(74) *Attorney, Agent, or Firm* — Global IP Counselors

(57) ABSTRACT

A motor for a compressor includes a rotor and a stator disposed radial outside of the rotor. The stator includes a stator core having oppositely facing axial end faces, insulators disposed so as to face the end faces, and coils wound on the stator core and the insulators. Each of the insulators has an annular part, a plurality of teeth protruding radially inwardly from an inner circumferential surface of the annular part at specified circumferential intervals, an outer circumferential wall having one end fixed to an end face of the annular part, and protrusions disposed on an outer circumferential surface of an outer circumferential wall of an insulator. At least one lead wire of the coils is drawn out to an outer circumferential side of the outer circumferential wall, guided along the outer circumferential wall, and passed on a side of the protrusions facing the stator core.

4 Claims, 8 Drawing Sheets

U.S. PATENT DOCUMENTS

| | | | |
|---|---|---|---|
| 7,944,109 B2 * | 5/2011 | Amano | 310/179 |
| 7,982,348 B2 * | 7/2011 | Hasegawa | 310/71 |
| 2002/0043883 A1 * | 4/2002 | Shimizu | 310/71 |
| 2003/0020344 A1 * | 1/2003 | Futami et al. | 310/71 |
| 2009/0102310 A1 * | 4/2009 | Amano | 310/215 |

FOREIGN PATENT DOCUMENTS

| | | |
|---|---|---|
| JP | 2001-218409 A | 8/2001 |
| JP | 2002-44892 A | 2/2002 |

* cited by examiner

MOTOR HAVING INSULATOR PROVIDED WITH PROTRUSIONS FOR LEAD WIRES TO BE TWISTED

CROSS-REFERENCE TO RELATED APPLICATIONS

This U.S. National stage application claims priority under 35 U.S.C. §119(a) to Japanese Patent Application No. 2006-331615, filed in Japan on Dec. 8, 2006, the entire contents of which are hereby incorporated herein by reference.

TECHNICAL FIELD

The present invention relates to a motor for use in a compressor of an air conditioner or a refrigerator, for instance, or the like, and relates to a compressor using the motor.

BACKGROUND ART

A motor for use in a compressor conventionally has a rotor and a stator placed on radial outside of the rotor, and the stator has a stator core, insulators that are placed so as to face axial end faces of the stator core, and coils that are wound on both the stator core and the insulators.

Lead wires are drawn out from the coils, and are connected to a board, for instance, so as to be supplied with a current from outside. There is a problem in that the lead wires may sway, protrude toward an inner diameter of the stator, come into contact with the rotor, and suffer damages.

For prevention of the sway of the lead wires, a member for guiding the lead wires is provided on an axial end face of the stator (see JP 11-215756 A).

In another motor, the lead wires are bundled by bundle strings for prevention of the sway of the lead wires (see JP 2002-44892 A).

SUMMARY OF INVENTION

Technical Problem

The conventional motors have problems in that necessity of additional members dedicated only to the guidance of the lead wires involves increase in number of components and that the bundling by the bundle strings is troublesome.

It is an object of the invention to provide a motor in which sway of the lead wires can be prevented without increase in number of components and troubles with work.

Solution to Problem

In order to achieve the object, a motor of the present invention comprises:
a rotor, and
a stator placed on radial outside of the rotor, wherein
the stator has
a stator core,
insulators that are placed so as to face each of end faces of the stator core facing in directions of an axis, and
coils that are wound on both the stator core and the insulators, and wherein
the insulators each have
an annular part,
a plurality of teeth that protrude inward radially from an inner circumferential surface of the annular part and that are arranged at specified intervals along a circumferential direction thereof, and
an outer circumferential wall having one end fixed to an end face of the annular part, wherein
protrusions are provided on an outer circumferential surface of the outer circumferential wall, and wherein
at least one of lead wires of the coils is drawn out to an outer circumferential side of the outer circumferential wall, guided along the outer circumferential wall, and passed on a side of the protrusions facing the stator core.

With such a motor, at least one of the lead wires of the coils is drawn out to the outer circumferential side of the outer circumferential wall and is passed on the side of the protrusions facing the stator core which protrusions are provided on the outer circumferential surface of the outer circumferential wall. Thus, the lead wires are hooked on the protrusions with guidance, rising and the like of the lead wires so that sway of the lead wires can be prevented without increase in number of components and troubles with work. Namely, necessity of additional members dedicated only to the guidance, rising and the like of the lead wires is eliminated. Besides, troubles with bundling by bundle strings are avoided.

In accordance with one aspect of the present invention, the lead wires are three in number, and wherein
the three lead wires are twisted with one another.

With such a motor, sway of the lead wires can reliably be prevented because the three lead wires are twisted with one another.

In accordance with one aspect of the present invention, the protrusions are provided on the outer circumferential surface of the outer circumferential wall, and wherein
two lead wires out of the three lead wires are passed on the side of the protrusions facing the stator core.

With such a motor, the two lead wires out of the three lead wires are passed on the side of the protrusions facing the stator core, and thus the lead wires are hooked on the protrusions so that sway of the lead wires can more reliably be prevented In accordance with one aspect of the present invention, the protrusions each comprise:
a main body part extending outward radially from the outer circumferential surface of the outer circumferential wall, and
a pawl part extending from the main body part toward the stator core in the direction of the axis.

With such a motor, the protrusions each have the main body part extending outward radially from the outer circumferential surface of the outer circumferential wall and the pawl part extending from the main body part toward the stator core in the direction of the axis. Thus, the lead wires are prevented by the main body parts from falling off to axial outside of the protrusions and are prevented by the pawl parts from falling off to radial outside of the protrusions. Therefore, sway of the lead wires can more reliably be prevented.

A compressor of the present invention comprises:
a sealed casing,
a compression element placed in the sealed casing,
the above motor that is placed in the sealed casing and that is for driving the compression element through a shaft.

With a compressor in accordance with the present invention, which includes the motor in accordance with at least one of the above aspects, the motor having a good quality can be produced with little consumption of time and efforts and thus the compressor can be obtained that has a good quality and that can easily be produced.

Advantageous Effects of Invention

With a motor in accordance with the present invention, at least one of the lead wires of the coils is drawn out to the outer circumferential side of the outer circumferential wall and is passed on the side of the protrusions facing the stator core which protrusions are provided on the outer circumferential surface of the outer circumferential wall. Thus, the lead wires are hooked on the protrusions so that sway of the lead wires can be prevented without increase in number of components and troubles with work.

With a compressor in accordance with the present invention, the provision of the motor results in obtainment of the compressor that has a good quality and that can easily be produced.

DESCRIPTION OF EMBODIMENTS

Figure 1:
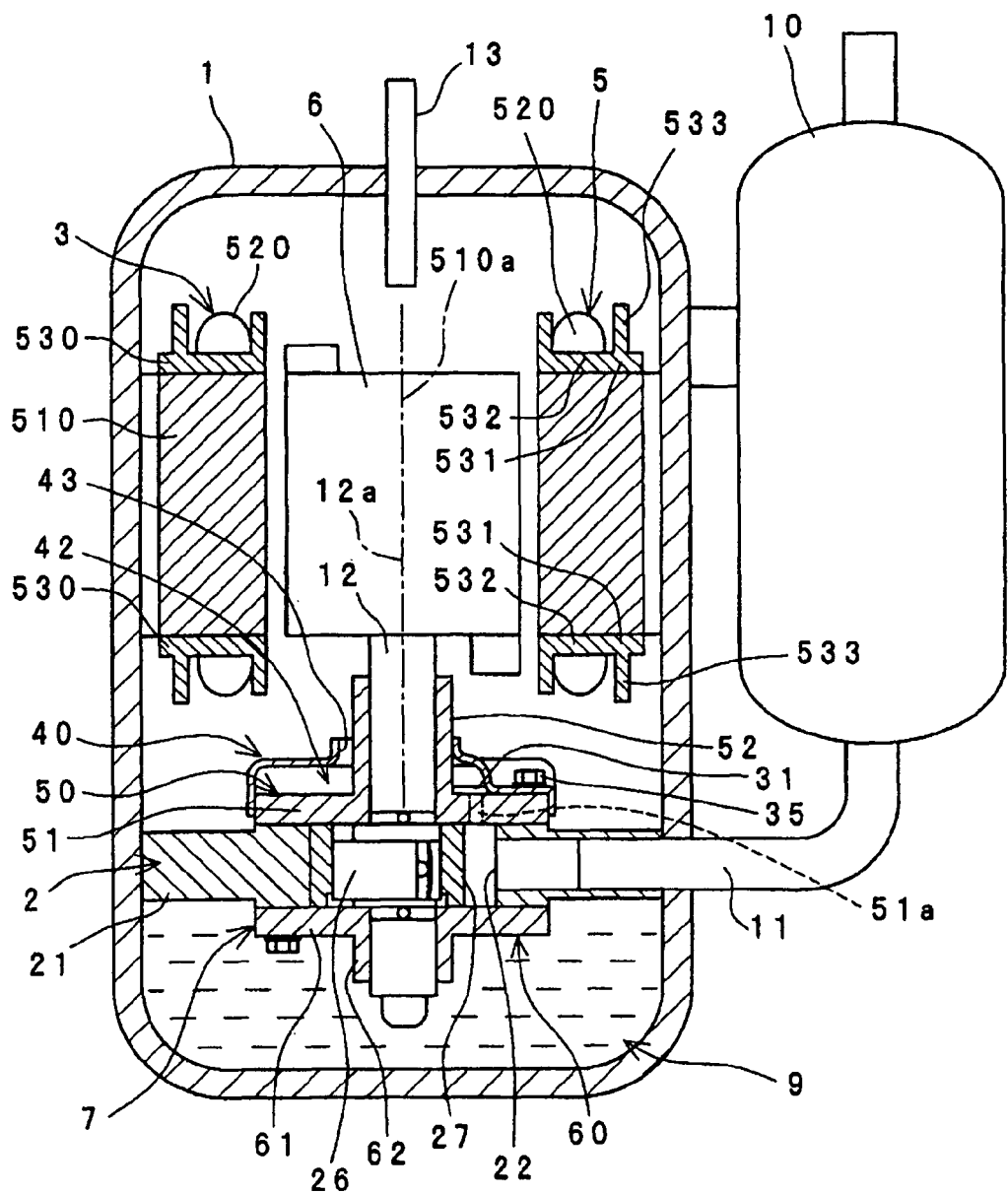
FIG. 1 is a longitudinal section showing an embodiment of a compressor of the invention.

Hereinbelow, the invention will be described in detail with reference to embodiments shown in the drawings.

First Embodiment

FIG. 1 shows a longitudinal section of an embodiment of a compressor of the invention. The compressor has a sealed container 1, a compression element 2 placed in the sealed container 1, and a motor 3 that is placed in the sealed container 1 and that drives the compression element 2 through a shaft 12.

The compressor is a rotary compressor of so-called vertical high-pressure dome type, having the compression element 2 placed on lower side and the motor 3 placed on upper side in the sealed container 1. The compression element 2 is driven through the shaft 12 by a rotor 6 of the motor 3.

The compression element 2 sucks in refrigerant gas from an accumulator 10 through a suction pipe 11. The refrigerant gas is obtained from control over the compressor, and over a condenser, an expansion mechanism, and an evaporator that are not shown and that form an air conditioner together with the compressor as an example of refrigeration system. The refrigerant gas is carbon dioxide, HC, HFC such as R410A, or HCFC such as R22, for example.

The compressor discharges compressed refrigerant gas having a high temperature and a high pressure from the compression element 2, fills inside of the sealed container with the gas, cools the motor 3 by passing the gas through a gap between the stator 5 and the rotor 6 of the motor 3, and thereafter discharges the gas to outside through a discharge pipe 13 provided above the motor 3.

In lower part of a high-pressure section in the sealed container 1 is formed an oil sump 9 in which lubricating oil is accumulated. The lubricating oil travels from the oil sump 9 through an oil passage (not shown) provided in the shaft 12 to sliding parts such as bearings of the compression element 2 and of the motor 3, which parts are thereby lubricated. The lubricating oil is polyalkylene glycol oil (such as polyethylene glycol and polypropylene glycol), ether oil, ester oil, or mineral oil, for example.

The compression element 2 has a cylinder 21 fixed to an inner surface of the sealed container 1, and has an upper end plate member 50 and a lower end plate member 60 mounted on upper and lower opening ends of the cylinder 21, respectively. A cylinder chamber 22 is defined by the cylinder 21, the upper end plate member 50, and the lower end plate member 60.

The upper end plate member 50 has a disc-like main body 51, and a boss 52 that is provided so as to extend upward from center of the main body 51. The shaft 12 is inserted into the main body 51 and the boss 52.

On the main body 51 is provided a discharge port 51a communicating with the cylinder chamber 22. On the main body 51, a discharge valve 31 is mounted so as to be positioned opposite to the cylinder 21 with respect to the main body 51. The discharge valve 31, which is, e.g., a reed valve, opens and closes the discharge port 51a.

On the main body 51, a cup-like muffler cover 40 is mounted opposite to the cylinder 21 so as to cover the discharge valve 31. The muffler cover 40 is fixed onto the main body 51 by a fixation member 35 (such as bolt). The boss 52 is inserted into the muffler cover 40.

A muffler chamber 42 is defined by the muffler cover 40 and the upper end plate member 50. The muffler chamber 42 and the cylinder chamber 22 communicate with each other through the discharge port 51a.

The muffler cover 40 has an aperture 43. The aperture 43 provides communication between the muffler chamber 42 and outside of the muffler cover 40.

The lower end plate member 60 has a disc-like main body 61, and a boss 62 that is provided so as to extend downward from center of the main body 61. The shaft 12 is inserted into the main body 61 and the boss 62.

In short, one end portion of the shaft 12 is supported by the upper end plate member 50 and the lower end plate member 60. That is, the shaft 12 is a cantilever. The one end portion (support end side) of the shaft 12 extends into the cylinder chamber 22.

On the support end side of the shaft 12, an eccentric pin 26 is provided so as to be positioned in the cylinder chamber 22 of the compression element 2. The eccentric pin 26 is fitted in a roller 27. The roller 27 is placed so as to be capable of making a revolution motion in the cylinder chamber 22, and a compression operation is carried out by the revolution motion of the roller 27.

In other words, the one end portion of the shaft 12 is supported by a housing 7 of the compression element 2 on both sides of the eccentric pin 26. The housing 7 includes the upper end plate member 50 and the lower end plate member 60.

Hereinbelow will be described the compression operation in the cylinder chamber 22.

Figure 2:
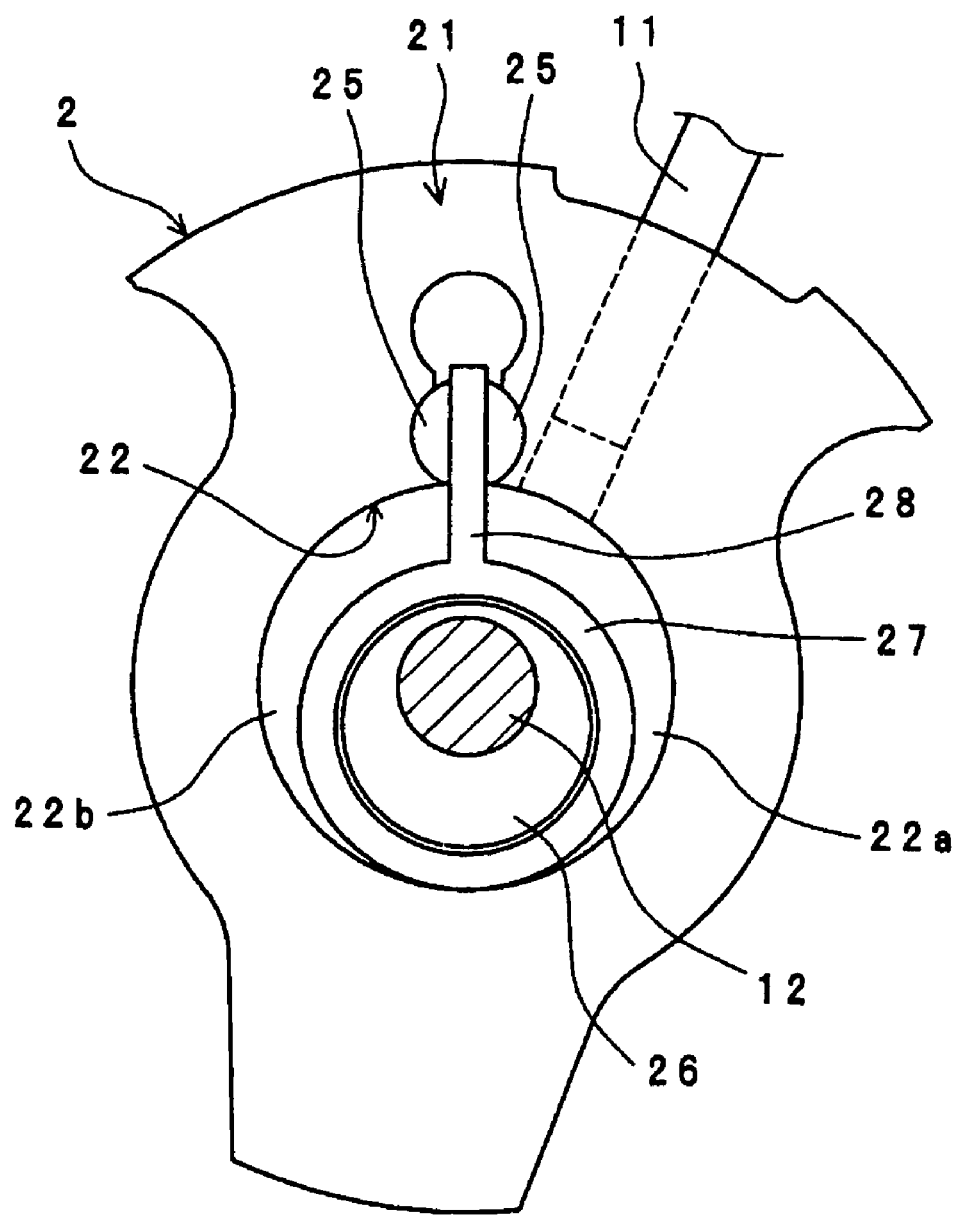
FIG. 2 is a plan view of main parts of the compressor.

As shown in FIG. 2, the cylinder chamber 22 is partitioned by a blade 28 provided integrally with the roller 27. That is, a chamber on right side of the blade 28 in which chamber the suction pipe 11 opens on an inner surface of the cylinder chamber 22 forms a suction chamber (low-pressure chamber) 22a. On the other hand, a chamber on left side of the blade 28 in which chamber the discharge port 51a (shown in FIG. 1) opens on the inner surface of the cylinder chamber 22 forms a discharge chamber (high-pressure chamber) 22b.

Semicylindrical bushes 25, 25 are in close contact with both surfaces of the blade 28 so as to effect sealing. Lubrication with the lubricating oil is performed between the blade 28 and the bushes 25, 25.

The eccentric pin 26 eccentrically rotates together with the shaft 12, so that the roller 27 fitted on the eccentric pin 26 revolves so as to make a revolution motion with an outer circumferential surface of the roller 27 being in contact with an inner circumferential surface of the cylinder chamber 22.

With the revolution motion of the roller 27 in the cylinder chamber 22, the blade 28 reciprocates with both the side surfaces of the blade 28 held by the bushes 25, 25. Accordingly, refrigerant gas having a low pressure is sucked from the suction pipe 11 into the suction chamber 22a, is then compressed in the discharge chamber 22b so as to have a high pressure, and thereafter the refrigerant gas having the high pressure is discharged from the discharge port 51a (shown in FIG. 1).

As shown in FIG. 1, subsequently, the refrigerant gas discharged from the discharge port 51a passes the muffler chamber 42 and is then discharged to outside of the muffler cover 40.

Figure 3:
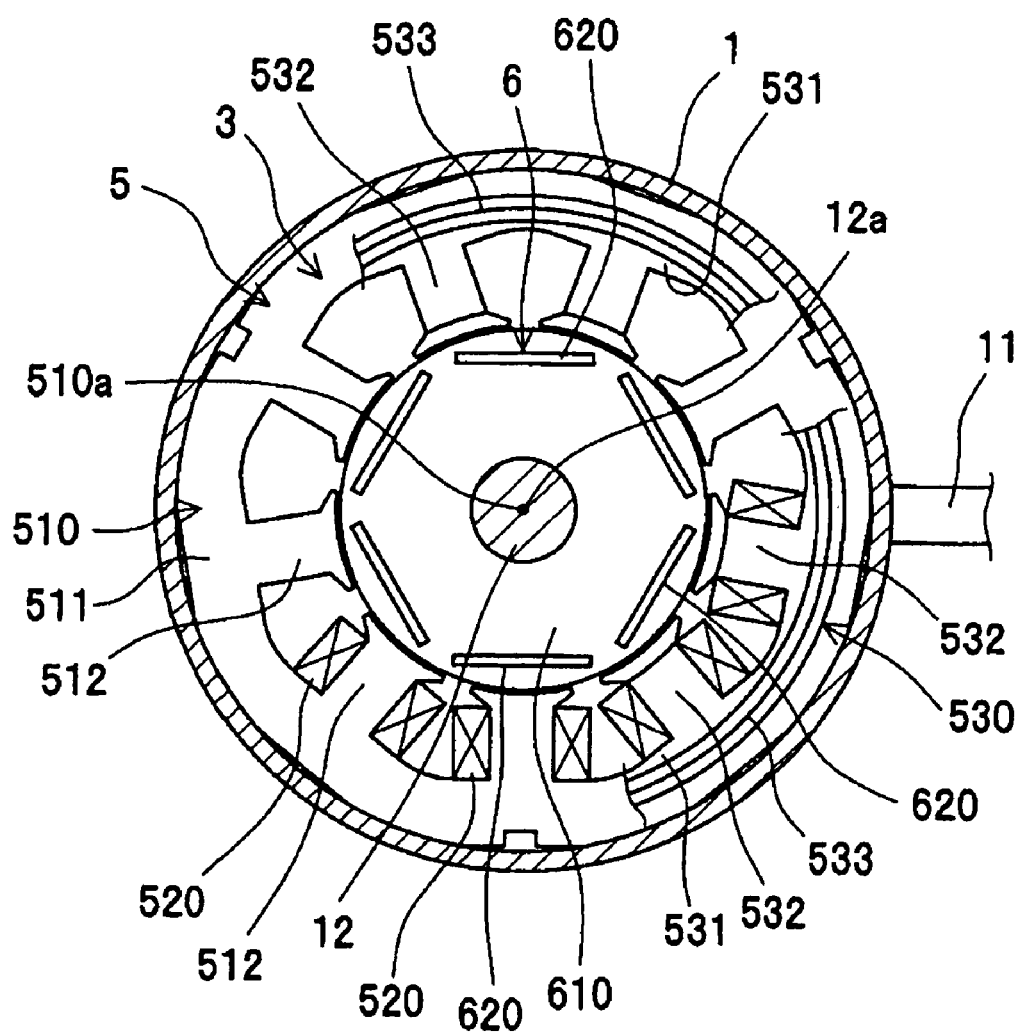
FIG. 3 is a cross section of vicinity of a motor of the compressor.

As shown in FIGS. 1 and 3, the motor 3 has the rotor 6 and the stator 5 that is placed on radial outside of the rotor 6 with an air gap therebetween.

The rotor 6 has a rotor body 610 and magnets 620 embedded in the rotor body 610. The rotor body 610 is shaped like a cylinder and is composed of, e.g., laminated electrical steel plates. The shaft 12 is fixed into a center bore of the rotor body 610. The magnets 620 are permanent magnets shaped like flat plates. The six magnets 620 are arranged at equal intervals with equal central angles along a circumferential direction of the rotor body 610.

The stator 5 has a stator core 510, insulators 530 that are placed so as to face both end faces of the stator core 510 facing in directions of an axis 510a of the stator core 510, and coils 520 that are wound on both the stator core 510 and the insulators 530. In FIG. 3, the coils 520 and the insulators 530 are depicted with some parts thereof omitted.

The stator core 510 is composed of a plurality of laminated steel plates and is fitted into the sealed container 1 by shrinkage fit or the like. The stator core 510 has an annular part 511 and nine teeth 512 that protrude inward radially from an inner circumferential surface of the annular part 511 and that are arranged at equal intervals along the circumferential direction.

The coils 520 are formed by so-called concentrated winding, that is, each of them is wound on each teeth 512 without being wound on a plurality of teeth 512. The motor 3 is a so-called 6-pole 9-slot motor. The rotor 6 is rotated along with the shaft 12 by an electromagnetic force that is produced in the stator 5 by currents flowing through the coils 520.

The insulators 530 are interposed and held between the stator core 510 and the coils 520 so as to effect insulation between the stator core 510 and the coils 520. The insulators 530 are made of resin material having satisfactory thermal resistance, such as liquid crystal polymer (LCP), polybutylene terephthalate (PBT), polyphenylene sulfide (PPS), polyimide and polyester. The insulators 530 are made of the material containing glass fiber for increase in strength, for instance.

The insulators 530 each have an annular part 531, a plurality of teeth 532 that protrude inward radially from an inner circumferential surface of the annular part 531 and that are arranged at equal intervals (as an example of specified intervals) along the circumferential direction, and an outer circumferential wall 533 having one end fixed to an end face of the annular part 531.

The annular parts 531 of the insulators 530 face the annular part 511 of the stator core 510 in contact therewith, and the plurality of teeth 532 of the insulators 530 face the plurality of teeth 512 of the stator core 510 in contact therewith.

The teeth 512 of the stator core 510 and the teeth 532 of the insulators 530 have generally the same shape as seen from the direction of the axis 510a of the stator core 510 (direction of a rotation axis 12a of the shaft 12).

Figure 4:
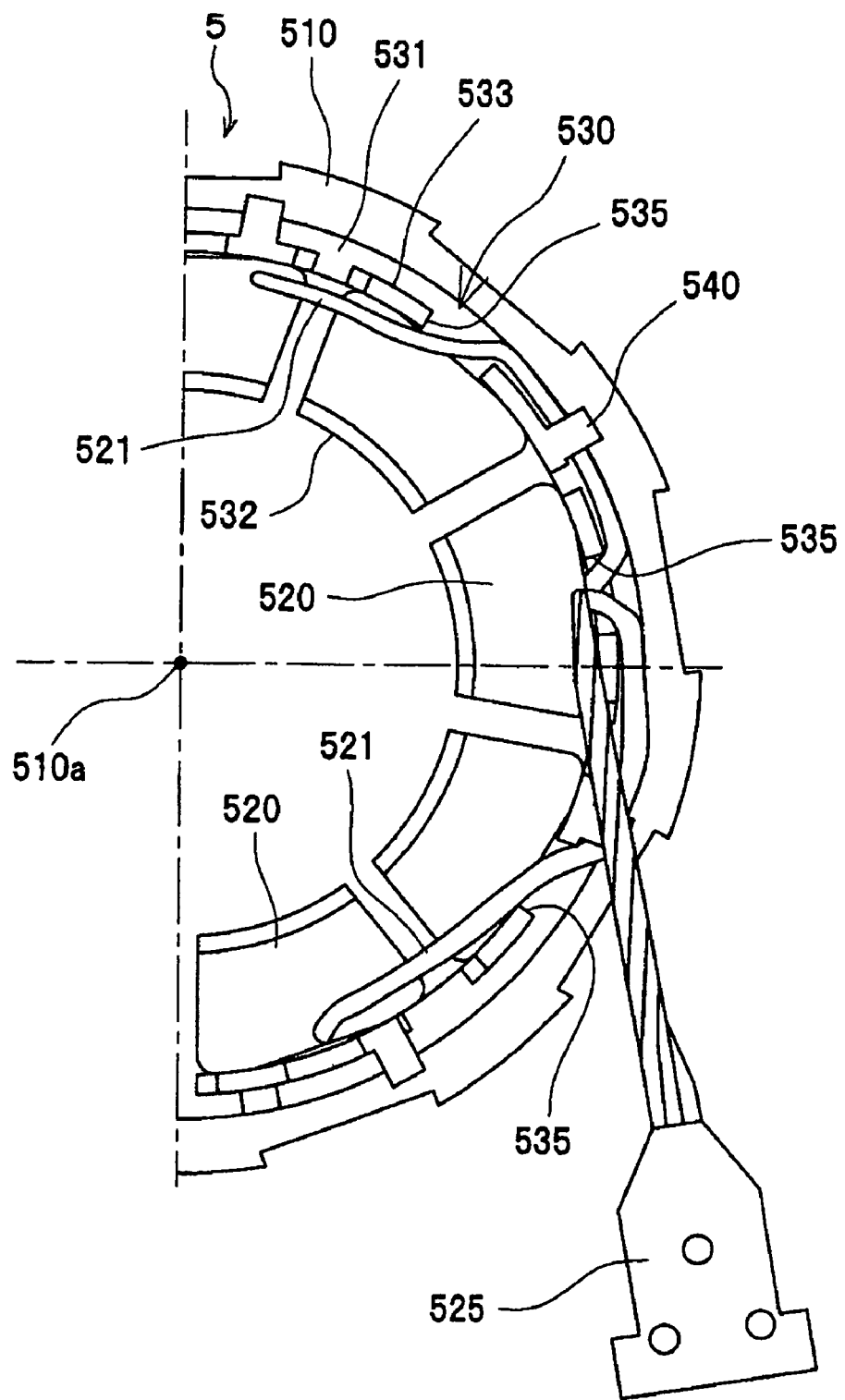
FIG. 4 is a plan view of a stator.
Figure 5:
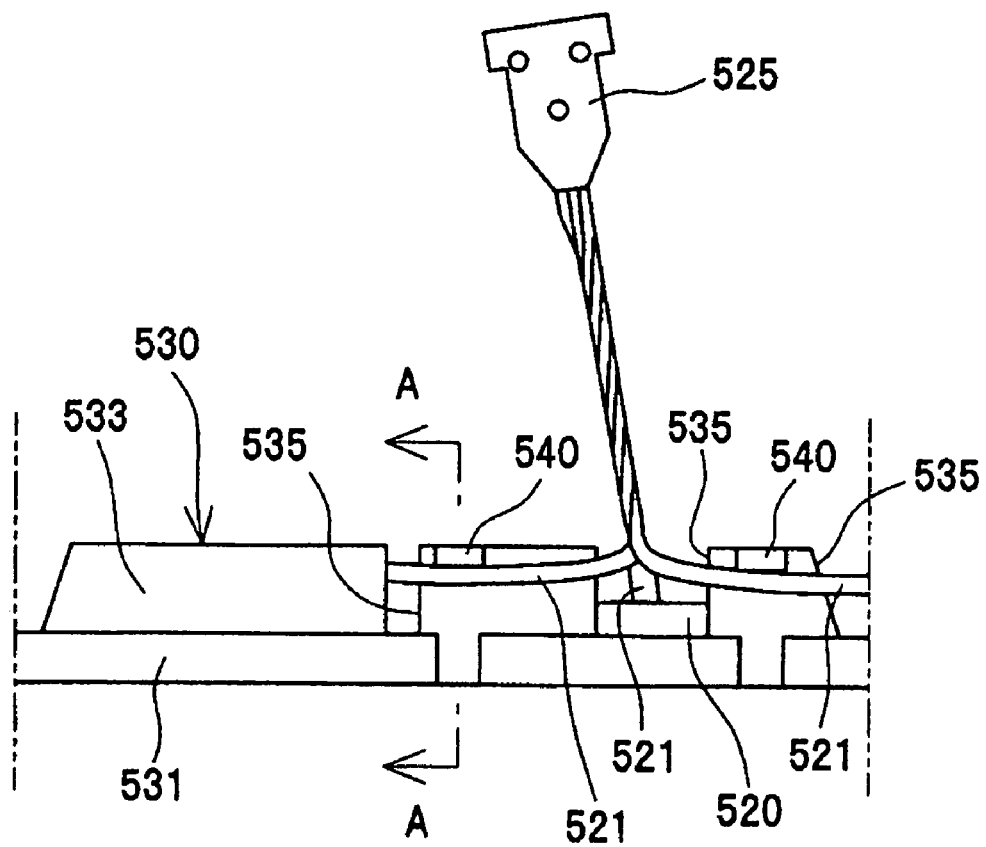
FIG. 5 is a development view of an insulator as seen from a side of an outer circumference thereof.

As shown in FIGS. 4 and 5, the outer circumferential wall 533 is provided with a plurality of cutouts 535 cut from the other end of the outer circumferential wall 535 toward the one end thereof. The plurality of cutouts 535 are arranged at specified intervals along a circumferential direction of the outer circumferential wall 533. The one end of the outer circumferential wall 533 is on a side of the annular part 531 and the other end of the wall 533 is on a side opposite to the annular part 531.

On an outer circumferential surface of the outer circumferential wall 533 are provided a plurality of protrusions 540. The plurality of protrusions 540 are arranged at specified intervals along the circumferential direction of the outer circumferential wall 533. FIG. 5 is a development view of the insulator 530 as seen from a side of the outer circumference thereof.

Three lead wires 521 are drawn out from the coils 520. The three lead wires 521 have extremities thereof inserted into a connector 525 and connected to terminal pins placed in a sealed container not shown and are thus supplied with a current from outside. The three lead wires 521 are controlled in U-, V-, and W-phases, respectively.

Two lead wires 521 out of the three lead wires 521 are drawn out to the outer circumferential side of the outer circumferential wall 533, guided along the outer circumferential wall 533, and passed on a side (underside) of the protrusions 540 facing the stator core 510.

Specifically, the three lead wires 521 are placed in a semicircular region including the axis 510a as seen from the direction of the axis 510a of the stator core 510. In that state, outside two of the lead wires 521 are passed through the cutouts 535 of the outer circumferential wall 533, guided to outside of the outer circumferential wall 533, passed through underside of the protrusions 540, and guided so as to join with the center lead wire 510. That is, both the outside lead wires 521 run through underside of the protrusions 540, between the cutouts 535 through which the wires are passed and the center lead wire 521.

Both the outside lead wires 521 pass through underside of the protrusions 540, and are then twisted together with the center lead wire 521. That is, the three lead wires 521 are twisted with one another between the connector 525 and the protrusions 540.

Figure 6:
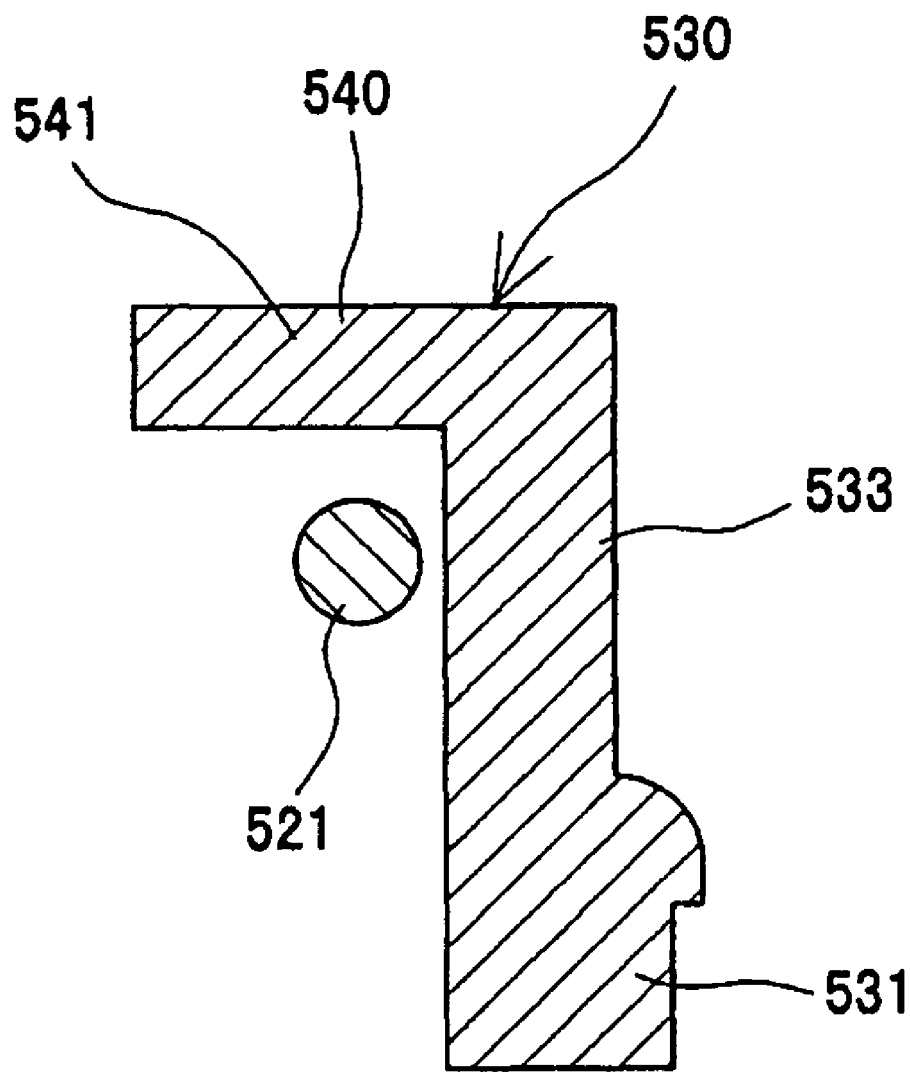
FIG. 6 is a section of the insulator.

As shown in FIG. 6, the protrusions 540 each have a main body part 541 extending outward radially from the outer circumferential surface of the outer circumferential wall 533. The lead wires 521 are passed through underside of the main body parts 541 so as to be hooked on the protrusions 540.

Hereinbelow will be described a method of making the three lead wires 521 trail over the insulator 530.

Figure 7:
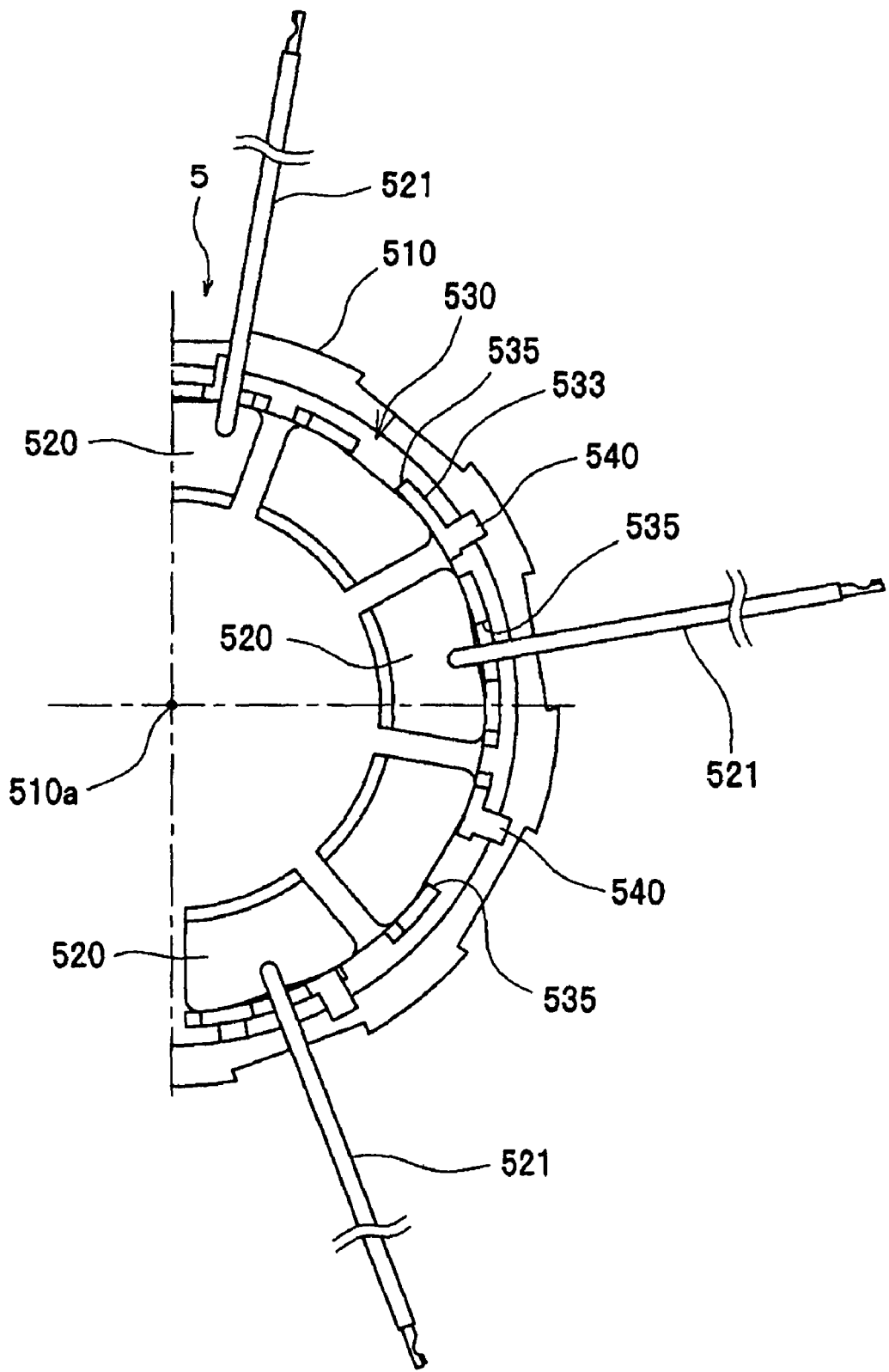
FIG. 7 is a plan view of the stator in which lead wires have not been assembled.

As shown in FIG. 7, both the outside lead wires 521 are passed through the cutouts 535 provided on the outer circumferential wall 533 and are guided to outside of the outer circumferential wall 533.

After that, both the outside lead wires 521 are passed through and hooked on underside of the protrusions 540 residing between the cutouts 535 through which the wires are passed and a part from which the center lead wire 521 rises, and are guided so as to join with the center lead wire 510.

Subsequently, both the outside lead wires 521 are returned to inside of the outer circumferential wall 533 through the cutout 535 residing on the part from which the center lead wire 521 rises, then both the outside lead wires 521 and the center lead wire 521 are twisted with one another, and the three lead wires 521 are positioned in the lump. As shown in FIG. 4, the extremities of the three lead wires 521 are thereafter inserted into the connector 525.

In the motor 3 having a configuration described above, sway of the lead wires 521 with the guidance, rising and the like of the lead wires 521 can be prevented without increase in number of components and troubles with work because the lead wires 521 are drawn out to the outer circumferential side of the outer circumferential wall 533 and are passed and hooked on the side (underside) of the protrusions 540 facing the stator core 510. Namely, necessity of additional members dedicated only to the guidance, rising and the like of the lead wires 521 is eliminated. Besides, troubles with bundling by bundle strings are avoided.

Consequently, the lead wires are prevented from swaying, springing toward of an inner diameter of the stator 5, coming into contact with the rotor 6, and suffering damages.

In addition, the sway of the lead wires 521 can reliably be prevented because the three lead wires 521 are twisted with one another.

Furthermore, the sway of the lead wires 521 can more reliably be prevented because the two lead wires 521 out of the three lead wires 521 are passed and hooked on the side (underside) of the protrusions 540 facing the stator core 510.

Besides, the protrusions 540 have the main body parts 541 extending outward radially from the outer circumferential surface of the outer circumferential wall 533, and therefore the main body parts 541 prevent the lead wires 521 from falling off to axial outside of the protrusions 540.

The compressor having the above configuration and including the motor 3 allows the motor 3 having a good quality to be produced with little consumption of time and efforts and thus presents the compressor that has a good quality and that can easily be produced.

Second Embodiment

Figure 8:
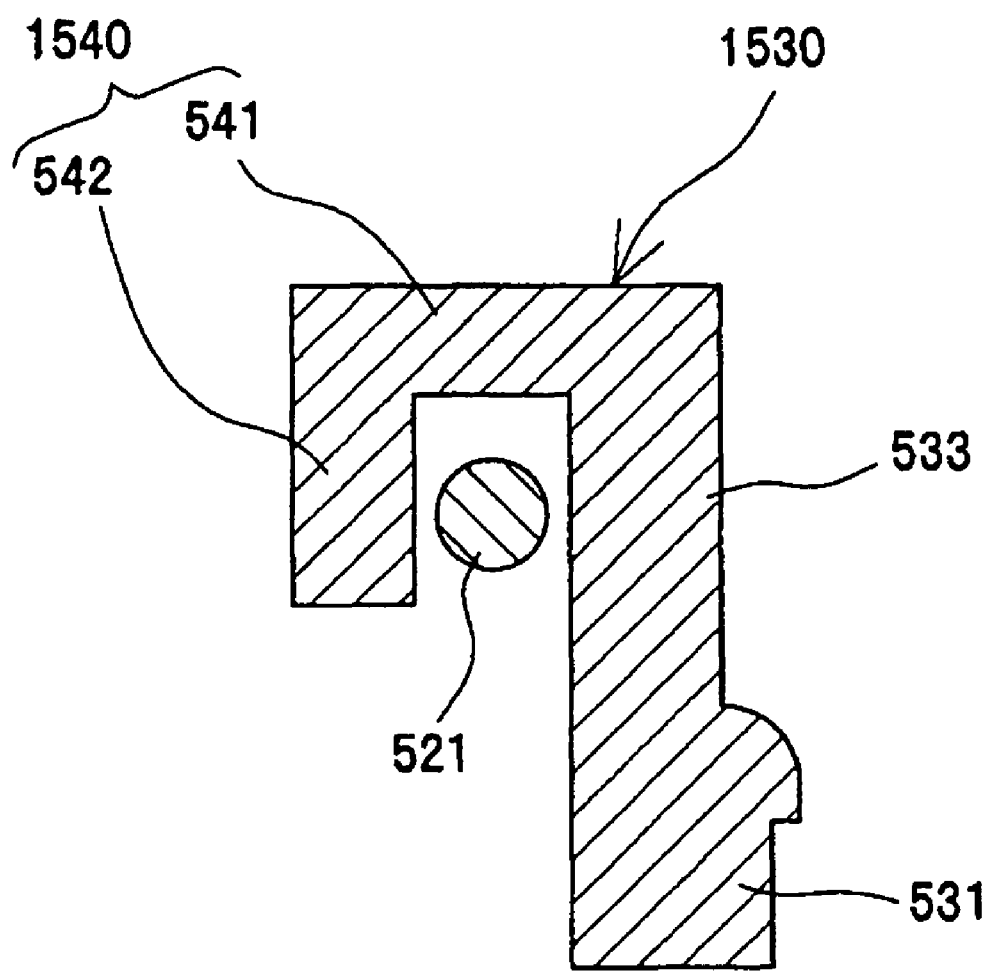
FIG. 8 is a section showing another embodiment of an insulator.

FIG. 8 shows another embodiment of an insulator. A protrusion 1540 of the insulator 1530 has a main body part 541 extending outward radially from an outer circumferential surface of an outer circumferential wall 533 and a pawl part 542 extending from the main body part 541 toward the stator core 510 in the direction of the axis 510a. Components of the second embodiment that are the same as those of the first embodiment are designated by the same reference numerals, and detailed description thereof is omitted.

The lead wires 521 are passed on the side (underside) of the protrusions 1540 facing the stator core 510 and are hooked in spaces formed between the outer circumferential wall 533 and the protrusions 1540.

Thus, the lead wires 521 are prevented by the main body parts 541 from falling off to axial outside of the protrusions 1540 and are prevented by the pawl parts 542 from falling off to radial outside of the protrusions 1540.

The invention is not limited to the embodiments described above. For instance, the insulators 530, 1530 are each integrally formed. The annular part 531, the teeth 532, and the outer circumferential wall 533 of the insulators 530, 1530, however, may be separate members.

The compression element 2 may be of rotary type in which a roller and a blade are separate members. As the compression element 2, scroll type, reciprocating type or the like may be used rather than the rotary type.

The compression element 2 may be of two-cylinder type having two cylinder chambers. The compression element 2 may be positioned on upper side and the motor 3 may be positioned on lower side. The motor 3 may be used in a fan or the like other than the compressor.

The number of the lead wires 521 may freely be increased and decreased as long as at least one of the lead wires 521 is drawn out to the outer circumferential side of the outer circumferential wall 533 and is hooked by being passed through underside of the protrusions 540, 1540. For instance, at least one lead wire 521 of the three lead wires 521 shown in FIG. 4 has only to be drawn out to the outer circumferential side of the outer circumferential wall 533 and has only to be hooked by being passed through underside of the protrusion 540.

The number of the protrusions 540, 1540 may freely be increased and decreased. The lead wires 521 may be hooked over a plurality of protrusions 540, 1540.

What is claimed is:

1. A motor comprising:
   a rotor; and
   a stator disposed radial outside of the rotor, the stator including
      a stator core having end faces that face in opposite axial directions of the stator,
      insulators disposed so as to face each of the end faces of the stator core, and
      coils wound on the stator core and the insulators,
      each of the insulators having
         an annular part,
         a plurality of teeth protruding radially inwardly from an inner circumferential surface of the annular part and arranged at specified intervals along a circumferential direction thereof,
         an outer circumferential wall having one end fixed to an end face of the annular part, and
         a plurality of protrusions disposed on an outer circumferential surface of the outer circumferential wall,
      lead wires of the coils, which are three in number,
      outside two lead wires of the three lead wires are respectively drawn out to an outer circumferential side of the outer circumferential wall of the insulator, guided along the outer circumferential wall of the insulator to a side of a center lead wire of the three lead wires, passed on a side of the protrusions facing the stator core, and then twisted with the center lead wire drawn out from inside of the outer circumferential wall of the insulator.

2. The motor as claimed in claim 1, wherein
   each of the protrusions includes
      a main body part extending radially outwardly from the outer circumferential surface of the outer circumferential wall, and
      a pawl part extending axially from the main body part toward the stator core.

3. A compressor including the motor set forth in claim 1, the compressor further comprising:
   a sealed casing; and
   a compression element disposed in the sealed casing,
   the motor being disposed in the sealed casing to drive the compression element using a shaft.

4. A compressor including the motor set forth in claim 2, the compressor further comprising:
   a sealed casing; and
   a compression element disposed in the sealed casing,
   the motor being disposed in the sealed casing to drive the compression element using a shaft.

* * * * *